United States Patent
Fu

(10) Patent No.: US 9,686,376 B2
(45) Date of Patent: *Jun. 20, 2017

(54) METHOD AND APPARATUS FOR DATA INTERACTION

(71) Applicant: Huawei Device Co., Ltd., Shenzhen (CN)

(72) Inventor: Xing Fu, Beijing (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 12 days.

This patent is subject to a terminal disclaimer.

(21) Appl. No.: 14/927,253

(22) Filed: Oct. 29, 2015

(65) Prior Publication Data

US 2016/0050293 A1    Feb. 18, 2016

Related U.S. Application Data

(63) Continuation of application No. 13/894,142, filed on May 14, 2013, now Pat. No. 9,203,896, which is a (Continued)

(30) Foreign Application Priority Data

Nov. 19, 2010    (CN) .......................... 2010 1 0551204

(51) Int. Cl.
     *G06F 15/16*      (2006.01)
     *H04L 29/08*      (2006.01)
     (Continued)

(52) U.S. Cl.
     CPC ............ *H04L 67/325* (2013.01); *H04L 67/10* (2013.01); *H04W 52/0251* (2013.01);
     (Continued)

(58) Field of Classification Search
CPC .. H04L 67/10; H04L 67/325; H04W 52/0251; H04W 52/0264; H04W 76/048; Y02B 60/46; Y02B 60/50
(Continued)

(56) References Cited

U.S. PATENT DOCUMENTS 7,961,703 B2 *   6/2011    Suzuki ................ H04W 76/045
                                                                     370/338
9,271,184 B2 *   2/2016    Raleigh ............. H04W 28/0289
(Continued)

FOREIGN PATENT DOCUMENTS

CN          1852131 A      10/2006
CN          1870767 A      11/2006
(Continued)

OTHER PUBLICATIONS

Chinese Search Report for Application No. 201010551204.6, mailed Sep. 7, 2012, 2 pages.
(Continued)

*Primary Examiner* — Davoud Zand
(74) *Attorney, Agent, or Firm* — Slater Matsil, LLP

(57) ABSTRACT

The present invention discloses a method and an apparatus for data interaction, and the method includes: obtaining required times of data interaction between valid applications in a background application mode and a network; selecting a minimum required time from the current required times as a target required time of data interaction, and starting timing; when the target required time expires, obtaining each valid application whose current required time of data interaction is between two consecutive target required times, and determining the valid application as a target application; and activating a packet data protocol PDP, establishing a data link between the target application and the network, and performing data interaction, and then restarting timing.

20 Claims, 6 Drawing Sheets

Related U.S. Application Data continuation of application No. PCT/CN2011/082177, filed on Nov. 15, 2011.

(51) Int. Cl.
 *H04W 52/02* (2009.01)
 *H04W 76/04* (2009.01)

(52) U.S. Cl.
 CPC ...... *H04W 52/0264* (2013.01); *H04W 76/048* (2013.01); *Y02B 60/46* (2013.01); *Y02B 60/50* (2013.01)

(58) Field of Classification Search
 USPC ....... 709/201, 217, 219–230, 232, 248, 249; 370/311, 431; 704/270.1; 340/2.8, 2.9
 See application file for complete search history.

(56) References Cited

U.S. PATENT DOCUMENTS

| | | |
|---|---|---|
| 2005/0085279 A1 | 4/2005 | Aoki |
| 2008/0102815 A1 | 5/2008 | Sengupta et al. |
| 2008/0263170 A1 | 10/2008 | Caron et al. |
| 2008/0267118 A1* | 10/2008 | Cai ...................... H04L 1/1671 370/329 |
| 2009/0210537 A1 | 8/2009 | Irwin et al. |
| 2011/0131321 A1 | 6/2011 | Black et al. |
| 2011/0185202 A1 | 7/2011 | Black et al. |
| 2011/0208815 A1 | 8/2011 | Kamat |
| 2011/0314145 A1* | 12/2011 | Raleigh ............... H04L 41/0893 709/224 |
| 2012/0120799 A1 | 5/2012 | Brisebois et al. |
| 2012/0215911 A1* | 8/2012 | Raleigh .................. H04L 12/14 709/224 |
| 2013/0254256 A1 | 9/2013 | Fu |
| 2013/0304616 A1 | 11/2013 | Raleigh et al. |
| 2014/0094159 A1 | 4/2014 | Raleigh et al. |
| 2014/0098671 A1 | 4/2014 | Raleigh et al. |
| 2014/0140213 A1 | 5/2014 | Raleigh et al. |
| 2014/0337519 A1* | 11/2014 | Raleigh ............... H04L 67/2804 709/224 |
| 2014/0337520 A1* | 11/2014 | Raleigh ............... H04L 67/2804 709/224 |
| 2015/0207708 A1* | 7/2015 | Raleigh ............... H04L 67/2804 709/217 |

FOREIGN PATENT DOCUMENTS

| | | |
|---|---|---|
| CN | 1959679 A | 5/2007 |
| CN | 1960355 A | 5/2007 |
| CN | 101754183 A | 6/2010 |
| CN | 102076065 A | 5/2011 |
| DE | 102008019287 A1 | 10/2009 |
| JP | 2004152268 | 5/2004 |
| JP | 2005130436 | 5/2005 |
| JP | 2007274728 | 10/2007 |
| WO | 2004043092 A1 | 5/2004 |
| WO | 20090127697 A1 | 10/2009 |

OTHER PUBLICATIONS

Extended European Search Report received in Application No. 11841564.5-1855, mailed Nov. 26, 2013, 8 pages.

Written Opinion of the International Searching Authority and International Search Report in Application No. PCT/CN2011/082177, mailed Feb. 23, 2012, 11 pages.

Notice of Reasons for Rejection issued in JP 2013-539125, mailing date: May 7, 2014, 9 pages including translation.

\* cited by examiner

METHOD AND APPARATUS FOR DATA INTERACTION

CROSS-REFERENCE TO RELATED APPLICATIONS

This application is a continuation of U.S. patent application Ser. No. 13/894,142, issued as U.S. Pat. No. 9,203,896, filed on May 14, 2013, which is a continuation of International Application No. PCT/CN2011/082177, filed on Nov. 15, 2011, which claims priority to Chinese Patent Application No. 201010551204.6, filed on Nov. 19, 2010, all of which are hereby incorporated by reference in their entireties.

FIELD OF THE INVENTION

The present invention relates to the field of mobile communication technologies, and in particular, to a method and an apparatus for data interaction.

BACKGROUND OF THE INVENTION

With the rapid development of mobile communications and terminals, more and more software used in social activities or instant messaging can be integrated into a terminal, for example, the campus network, Twitter, Microsoft chat tool windows live messenger, email application, and Tencent QQ. When the applications run in the background application mode, the applications perform data interaction with the network once at regular required times according to respective timers to update data information.

In the prior art, when multiple applications (such as QQ, twitter, and email) run on the background simultaneously and perform interaction with the network according to respective timers, after respective required times expire, the applications respectively activate PDP (Packet Data Protocol, packet data protocol), establish data links, and cause the terminal to generate inherent power consumption in the respective PDP activation process. For example, QQ initiates a request to a server at an interval of 30 minutes to obtain the latest state of current online friends; email actively initiates a data link at an interval of 35 minutes, and downloads emails from the server; when running on the background, the twitter initiates a data link at an interval of 45 minutes to obtain data from the server. To conclude, the terminal integrating or loading the applications activates PDP three times within 15 minutes to establish respective data links, and cause the terminal to generate inherent power consumption three times respectively.

Therefore, when the prior art is used to perform data interaction between each application in the background application mode and the network, because each application independently sends a PDP activation request to establish the corresponding data link to perform data interaction with the network, the terminal generates plenty of power consumption repeatedly in the process of continuously independently sending PDP activation requests, electricity consumption of the terminal is increased, and the standby time of the terminal is shortened.

SUMMARY OF THE INVENTION

In view of this, the present invention provides a method and an apparatus for data interaction, so as to overcome the following problems in the prior art: Because the applications in the background application mode continuously independently activate PDP, the terminal continuously generates plenty of power consumption repeatedly, electricity consumption of the terminal is increased, and the standby time of the terminal is shortened.

To meet the preceding purpose, the present invention provides the following technical solutions:

A method for data interaction includes:

obtaining required times of data interaction between every valid application in a background application mode and a network;

selecting a minimum required time from the required times as a target required time of data interaction, and starting timing; and when the target required time expires, obtaining each valid application whose current required time of data interaction is between two consecutive target required times, and determining the valid application as a target application; and activating a packet data protocol PDP, establishing a data link between the target application and the network, and performing data interaction.

An apparatus for data interaction includes:

an obtaining unit, configured to obtain required times of data interaction between valid applications in a background application mode and a network;

a selecting unit, configured to select a minimum required time from the required times as a target required time of data interaction;

a timing unit, configured to start timing required time and reset the target required time;

a determining unit, configured to: when the target required time expires, obtain each valid application whose current required time of data interaction is between two consecutive target required times, and determine the valid application as a target application; and an interacting unit, configured to activate a packet data protocol PDP, establish a data link between the target application and the network, and return to the selecting unit after performing data interaction.

As seen from the above technical solutions, compared with the prior art, the present invention discloses a method and an apparatus for data interaction, including: obtaining required times of data interaction between valid applications in a background application mode and a network; selecting a minimum required time from the current required times as a target required time of data interaction; when the target required time expires, determining valid applications suitable for performing data interaction, so that the valid applications establish respective data links after activating the packet data protocol at the same time to perform data interaction with the network and obtain corresponding data; and if valid applications exist, when the target required time expires, cyclically performing data interaction between the valid applications and the network. With the method and apparatus for data interaction disclosed by the present invention, the frequency of data interaction between each application running on the background and the network is synchronized, and after PDP is activated once, the data link of each application is established to perform data interaction with the network, which, while satisfying each valid APP in the background application mode, reduces the number of times of activating PDP, and achieves the purpose of decreasing power consumption, reducing electricity consumption of the terminal, and prolonging the standby time of the terminal.

BRIEF DESCRIPTION OF THE DRAWINGS

To illustrate the technical solutions in the embodiments of the present invention or in the prior art more clearly, the following briefly describes the accompanying drawings required for describing the embodiments or the prior art. Apparently, the accompanying drawings in the following description merely show some embodiments of the present invention, and a person of ordinary skill in the art can derive other drawings from these accompanying drawings without creative efforts.

DETAILED DESCRIPTION OF THE EMBODIMENTS

For the purpose of citation and clarity, the description and abbreviations or acronyms of technical terms used herein are listed as follows:

DCH: dedicated channel;
PS: packet switched;
PDP: Packet Data Protocol, packet data protocol;
DM: daemon manager, background application;
RT: required time, required time;
APP: application, which refers to all applications in a broad sense.

The technical solutions in the embodiments of the present invention will be clearly and fully described in the following with reference to the accompanying drawings. It is obvious that the embodiments to be described are only a part rather than all of the embodiments of the present invention. All other embodiments obtained by a person skilled in the art without creative efforts based on the embodiments of the present invention are fall within the protection scope of the present invention.

When APPs such as twitter (twitter), windows live message (Microsoft chat tool), email (mailbox), and QQ (Tencent chat tool) are in the background application mode (for example, when QQ is in the user-visible state, that is, a user uses QQ for chatting, QQ is in the foreground application mode; when QQ is minimized to the notification area, QQ exists in a user-invisible form, that is, QQ is in the background application mode), each APP needs to respectively activate PDP when the respective RT of interacting with the network expires, and establishes a link with the network, and performs data interaction continuously. Because plenty of power consumption is generated in the process of interaction between the APPs in the background application mode and the network, the electricity consumption of the terminal is increased, and the standby time of the terminal is shortened. To avoid the preceding problems, while satisfying each valid APP in the background application mode, the present invention uses the following mode to decrease the number of times of activating PDP, and achieve the purpose of decreasing power consumption, reducing electricity consumption of the terminal, and prolonging the standby time of the terminal: After each application enters the background application mode, each APP, for example, QQ and other applications, submits its RT of interacting with the network to the DM, and the DM uniformly manages the trigger time point of interaction between the APP and the network, so that the frequency of data interaction between each APP and the network is synchronized, that is, after PDP is activated, each APP starts establishing a data link after receiving a notification from the DM. The specific implementation is described in detail through the following embodiments.

Embodiment 1

Figure 1:
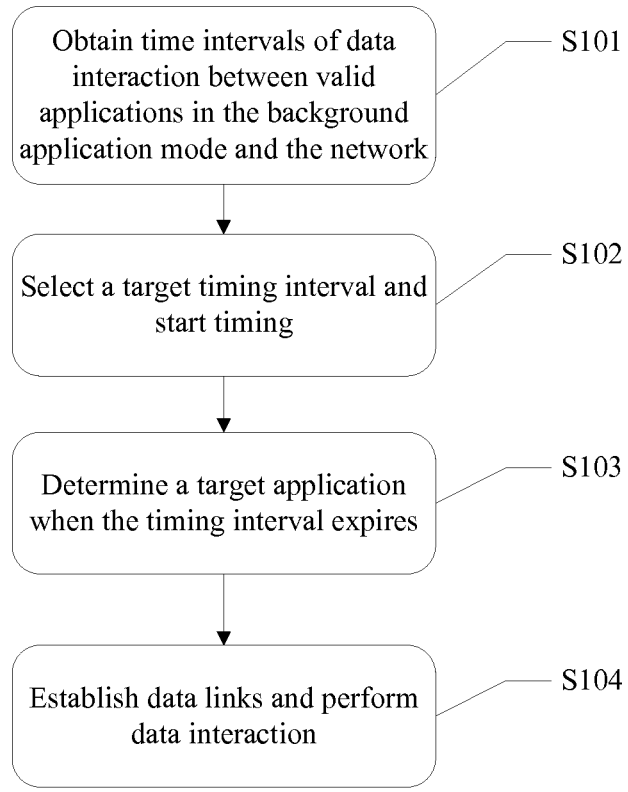
FIG. 1 is a flowchart of a method for data interaction according to a first embodiment of the present invention.

Referring to FIG. 1, this embodiment mainly includes the following steps:

Step S101: Obtain RTs of data interaction between each valid APP in the background application mode and the network.

In step S101, the DM obtains RTs of data interaction between each valid APP in the background application mode and the network.

The valid APP refers to an APP whose running state is in the user-invisible form after the terminal starts each APP, that is, the APP currently in the background application mode submits registration request to the DM, and the APP submitting registration to the DM is the current valid APP.

Step S102: Select a minimum RT from the RTs as a target required time of data interaction, and start the timer in the DM to perform timing.

When step S102 is executed, the minimum RT is selected from the required time RTs received by the DM in step S101 as a target required time of the timer of the DM.

Step S103: Use a time point when the target required time expires as a time point for triggering data interaction; when the target required time expires, obtain each valid APP whose current required time of data interaction is between two consecutive target required times, and determine the valid APP as a target APP.

In step S103, the time point when the current target required time expires is determined as a time point for triggering data interaction; in step S102, the timer of the DM is started according to the target required time, that is, the timer of the DM is set to a target required time. When the target required time expires, the DM determines the valid APPs requiring data interaction as target APPs, and sends a notification for data interaction with the network to each target APP.

The determining, by the DM, the target APPs requiring data interaction means that each valid APP also performs countdown based on the RT according to its timer when the DM performs cyclic timing based on the minimum RT. Every time when the timer of the DM expires, the DM judges whether the RT in the timer of each valid APP is currently between the previous target required time and the current target required time, and obtains valid APPs whose current RT is between the two consecutive target required times, and the valid APPs are target APPs suitable for performing data interaction.

It should be noted that after the timer is started, when whether the target required time expires is determined, the countdown or countup mode may be used. However, the mode used by the embodiment of the present invention is not limited thereto.

Step S104: Activate PDP, establish data links between the target APPs and the network, and perform data interaction.

After step S103 is executed, it is determined that each target APP has received a notification for data interaction with the network, and then step S104 is executed. Before the first target APP performs data interaction with the network, PDP is activated; then the respective data link between the network and each target APP is established, so that each target APP establishes its data link based on the activated PDP, and completes the data interaction with the network.

It should be noted that, when each target APP performs data interaction with the network, the timers of all target APPs are reset, and the timer of the DM is also reset. In the case that the minimum RT is not changed, the timer of each target APP and the timer of the DM are restarted, that is, step S103 to step S104 are cyclically executed until there is no target APP. With the method disclosed by the present invention, each valid APP can submit the RT of data interaction with the network to the DM; the DM synchronizes the frequency of data interaction between each valid APP and the network, and on the basis of activating PDP only once, each valid APP establishes its data link to perform data interaction with the network, which, while satisfying each valid application, decreases the number of times of activating PDP to establish data links, and achieves the purpose of decreasing power consumption, reducing electricity consumption of the terminal, and prolonging the standby time of the terminal.

To embody the method disclosed by the present invention more clearly, an example is described herein. For example, in the implementation of the terminal, currently three applications need to run on the background, and need to interact with the network. The three applications are respectively: email, twitter, and QQ. The RT of email is 10 minutes, the RT of twitter is 15 minutes, and the RT of QQ is 40 minutes.

The terminal is powered on; after the three applications enter the background application mode, the three applications uniformly submit RTs to the DM, and the DM uses 10 minutes as its timer time.

At the 10th minute after power-on, the first RT of the timer of the DM expires and the DM performs broadcasting, the email and twitter send requests at the same time for establishing a data link after receiving the notification, and complete the data interaction with the server in the network. The RT of twitter, which is 15 minutes, is between two target required times, and the RT of QQ, which is 40 minutes, does not satisfy the interaction condition, and the same case occurs even at the 20th and 30th minute, but at the 40th minute, the RT of QQ satisfies the condition of data interaction. After the DM performs broadcasting, the three applications all establish data links to complete data interaction with the server. Thereby, compared with the method of the prior art that causes the terminal to activate PDP seven times and establish data links, the method disclosed by the present invention uses the DM in the terminal to perform coordinated control for each APP, so that the terminal activates PDP only four times and establishes data links, thereby decreasing the number of times of activating PDP. Therefore, power consumption of the terminal is reduced, plenty of electricity is saved, and the standby time of the terminal is prolonged.

Figure 2:
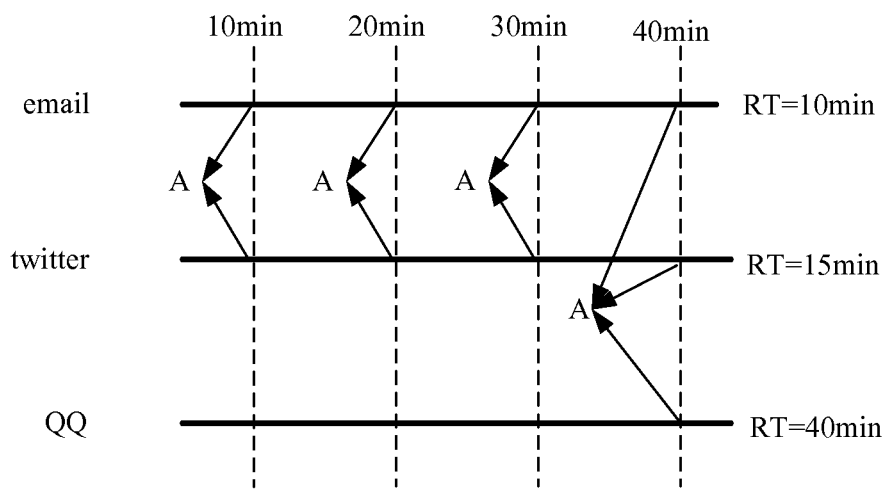
FIG. 2 is a schematic diagram illustrating a specific data interaction process according to the first embodiment.

The DM broadcast refers to an interaction mode between applications. The DM may send the same information to multiple registered applications simultaneously, that is, send a notification (interaction instruction) for interaction between the APP and the network. The specific execution process is shown in FIG. 2, where A is a time point for performing data interaction (namely, a time point for activating PDP), RT is a required time, and email, twitter, and QQ are valid APPs currently running in the background application mode.

In addition, when step S103 in the first embodiment is executed, many cases may occur. The following describes by way of example the case that may occur when the step is executed, and the corresponding case arising therefrom.

Embodiment 2

Figure 3:
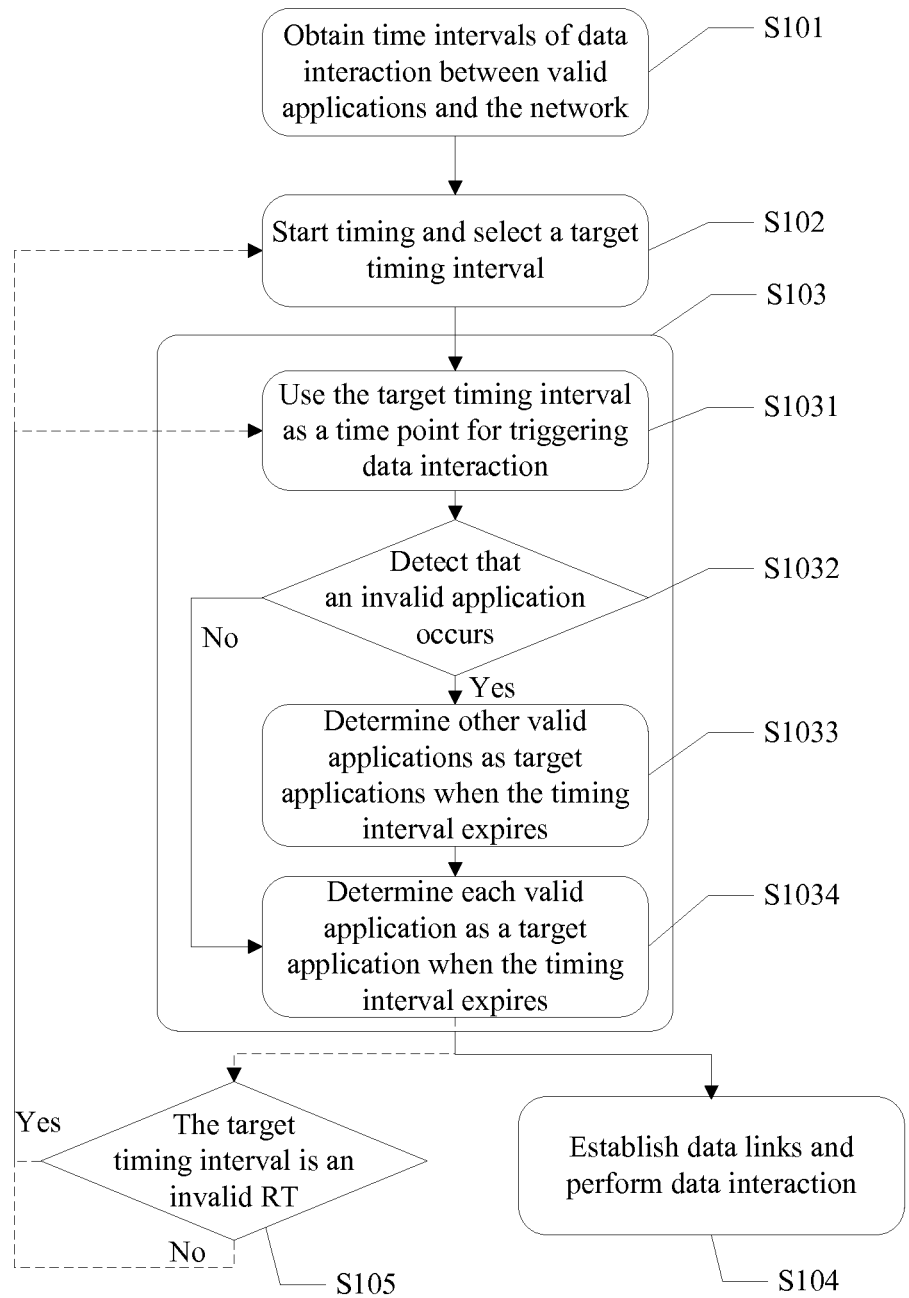
FIG. 3 is a flowchart of a method for data interaction according to a second embodiment of the present invention.

Referring to FIG. 3, this embodiment specifically includes the following steps:

Step S101: Obtain RTs of data interaction between each valid APP in the background application mode and the network.

Step S102: Select a minimum RT from the current RTs as a target required time of data interaction, and start the timer in the DM to perform timing.

Step S103: Use a time point when the target required time expires as a time point for triggering data interaction; when the target required time expires, obtain each valid APP whose current required time of data interaction is between two consecutive target required times, and determine the valid APP as a target APP. In step S103, the specific process of determining each valid APP as a target APP is as follows:

Step S1031: Use the target required time as a time point for triggering data interaction.

Step S1032: Before the target required time expires, detect whether any invalid APP occurs in the valid APPs between two consecutive target required times, and if an invalid APP occurs, execute step S1033, or if no invalid APP occurs, execute step S1034.

In the following case, the invalid APP means that a valid APP in the background application mode submits deregistration request to the DM when the work mode of the valid APP is changed to the foreground application (the foreground application is relative to the background application, and at this time, the APP is in the state of active use by the user, that is, the APP is in the user-visible state), and the valid APP currently submitting deregistration request becomes an invalid APP.

Step S1033: When the target required time expires, determine other valid APPs as target APPs for performing data interaction with the network.

Step S1034: Determine each valid APP as a target APP when the target required time expires.

As seen from the specific process of executing step S103, determining the target APP whose required time of data interaction is between two consecutive target required times further requires each valid APP to determine whether to perform data interaction after receiving the notification, that is, determine whether each valid APP itself is still valid and is still in the background application mode.

Therefore, in executing step S103 to determine target APPs that may perform data interaction with the network, the target APPs need to satisfy the following condition: During the time period from the start of the timer to expiry of the required time, each valid APP between the previous target required time and the expiry of the current target required time has never been invalid.

Step S104: Activate PDP, establish data links between the target APPs and the network, and perform data interaction.

Step S104 is executed to activate PDP before the first target APP performs data interaction with the network, and then data links between the network and each target APP are established, so that each target APP may establish its own data link on the basis of activating PDP only once, and complete data interaction with the network.

In the second embodiment, the processes of executing step S101 to step S102 and step S104 are consistent with the counterpart in the first embodiment, and are not further described herein. However, it is determined through judgment in step S103 that an invalid APP occurs; in this case, based on the target required time, step S104 is executed so that each target APP performs data interaction with the network. After the timers maintained by all target APPs performing data interaction with the network are reset, that is, the RT of each target APP is reset, and the minimum RT in the timer maintained by the DM is also reset, to ensure accuracy of the next target required time, that is, to determine that the minimum RT is not changed, when step S104 is executed, the RT in each valid APP also needs to be detected, that is, step S105 (the dotted line part in the flowchart) is executed.

Step S105: Detect whether the target required time is the RT of the invalid APP, and if so, return to step S102, or if not, return to step S1031.

Therefore, when each target APP performs data interaction with the network, the timers of all target APPs are reset, and the timer of the DM is also reset. When the minimum RT is changed, the procedure may return to step S102: Reselect a minimum RT from the current RTs as a target required time, then restart the timer, and continue to execute following steps.

To describe the technical solution of the second embodiment more clearly, herein an example is described for the case of judging whether the APPs in the background application mode are valid.

For example, two APPs (QQ and email) in the background application mode submit registration information to the DM, which corresponds to step S101: The DM receives the RT in the registration information submitted by two APPs. The RT submitted by QQ is 30 minutes, and the RT submitted by email is 40 minutes. Corresponding to step S102, in this case, the timer of the DM is set to 30 minutes. Corresponding to step S103, in this case, the target required time is set to 30 minutes.

When one RT expires, that is, when the target required time of 30 minutes expires, the RT of email, which is 40 minutes, is between the two target required times. When it is determined that the two APPs exist, it is determined that both the two APPs may perform data interaction with the network, that is, the corresponding step S104 is executed.

Figure 4:
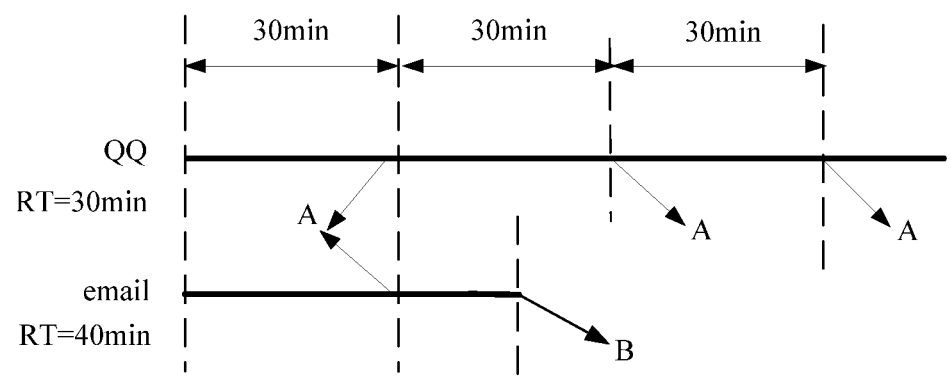
FIG. 4 is a schematic diagram illustrating a data interaction process according to the second embodiment.

Corresponding to step S1032, before an RT expires, that is, before the target required time of 30 minutes expires, if email submitting the 40-minute RT deregisters (cancels registration), that is, email becomes an invalid APP, valid APPs at this time only include QQ; therefore, after the RT expires, QQ executes step S104 to complete data interaction with the network and obtain the data on the network server. Corresponding to step S105, because the RT submitted by the invalid APP (email) is 40 minutes and is not the target required time, the procedure returns to step S1031 to wait for expiry of the next RT (30 minutes). The specific data interaction process is shown in FIG. 4, where QQ and email are APPs, A is the time point of data interaction between the APP and the network, B is the time point for canceling registration by the APP, and RT is a required time.

Figure 5:
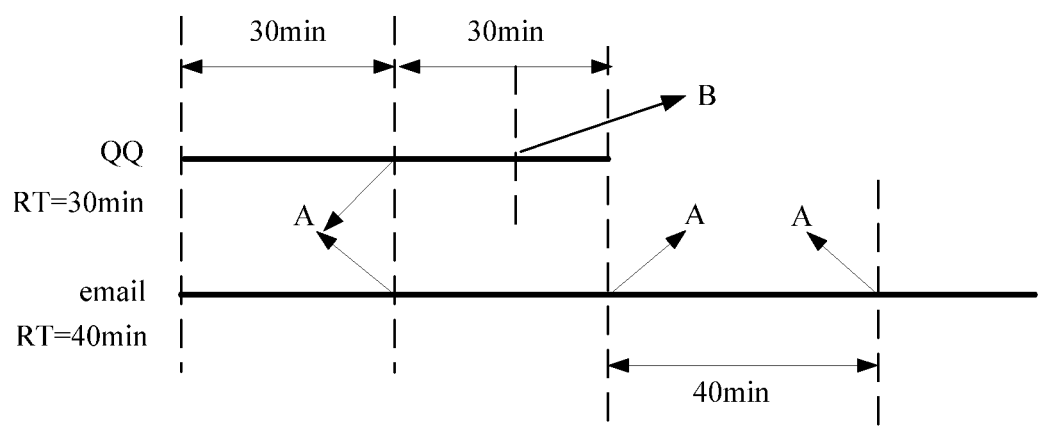
FIG. 5 is a schematic diagram illustrating another data interaction process according to the second embodiment.

Corresponding to step S1032, before an RT expires, that is, before the target required time of 30 minutes expires, if the QQ submitting the 30-minute RT cancels registration, because the APP corresponding to the target required time RT of 30 minutes cancels registration, after the current required time of 30 minutes, after the data interaction between the email not canceling registration and the network is completed, step S105 is correspondingly executed, and the procedure returns to step S102 to re-determine a target required time. In the current actual application, after the return, only one email application whose RT is 40 minutes exists; therefore, in this case, the timer of the DM is set to 40 minutes and is validated when the next RT expires, that is, related steps are executed after the next target required time 40 expires. The specific data interaction process is shown in FIG. 5, where QQ and email are APPs, A is the time point of data interaction between the APP and the network, B is the time point for canceling registration by the APP, and RT is a required time.

With the method disclosed by the second embodiment of the present invention, optional solutions are provided for the case that may occur in the actual application. When there is no invalid APP, the technical solution same as the first embodiment is executed. The DM synchronizes the frequency of data interaction between each valid APP and the network according to the determined target required time, and the opportunity of activating PDP once is used to establish a data link to interact with the network, which, while satisfying each valid APP, reduces the number of times of activating PDP to establish data links, and achieves the purpose of decreasing power consumption, reducing electricity consumption of the terminal, and prolonging the standby time of the terminal.

In addition, on the basis of the first embodiment disclosed by the present invention, the present invention further includes an execution process after a new APP submitting registration is detected, and the specific process is described in the third embodiment disclosed by the present invention.

Embodiment 3

Figure 6:
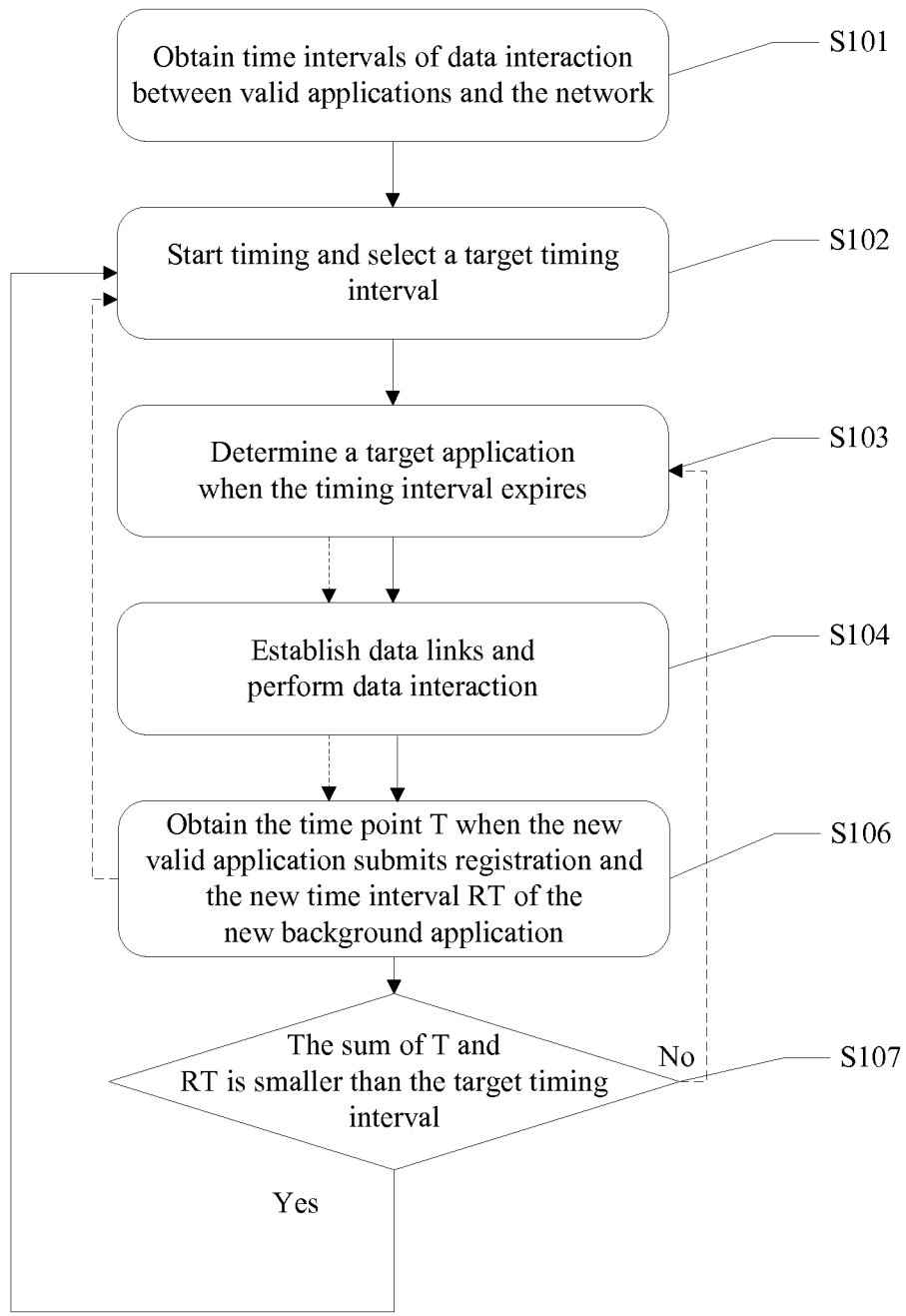
FIG. 6 is a flowchart of a method for data interaction according to a third embodiment of the present invention.

Referring to FIG. 6, this embodiment specifically includes steps S101 to S107. The processes of executing step S101 to step S104 are consistent with the corresponding step S101 to step S104 in the first embodiment, and are not further described herein. The difference between the third embodiment and the first embodiment lies in whether the DM has obtained the registration information of the new valid APP, that is, whether the DM has received the new RT submitted by the new APP, at a time point T after the target required time is restarted or reset (that is, after data interaction is completed) and before the next target required time expires. To be specific, after step S104, the following steps are further included:

Step S106: Obtain the time point T when the new valid APP submits registration and the new RT of the new valid APP.

Step S107: Detect whether the sum of the new RT and the time point T is smaller than the target required time, and if so, determine the new RT as a target required time and return to step S103, or if not, re-execute step S103 and step S104 and then return to step S102 (the return process is indicated by a dotted line in the flowchart).

By executing the method disclosed by the third embodiment, on the basis of the first embodiment, the problem of submitting registration information by new valid APPs is further solved, that is, the new RT obtained by the DM is compared with the previously obtained RT, so that the minimum RT, namely, the required time of the DM, is determined, which ensures completion of data interaction with the network when the accurate target required time expires. Herein an example is described for the two cases in step S107, using the actual application of the method in the terminal.

For example, only one valid APP1 in the background application mode in the current terminal submits registration information to the DM, where the RT1 of the valid APP is 40 minutes.

The first case is that when an RT (the target required time is 40 minutes at this time) expires (at this time, data interaction is completed and the timer is restarted or reset) and at the 5th minute (herein the 5th minute is the time point T when the valid APP2 submits registration) after the broadcast of the DM, another valid APP2 submits registration information to the DM, where the RT2 of the valid APP2 is 30 minutes.

Figure 7:
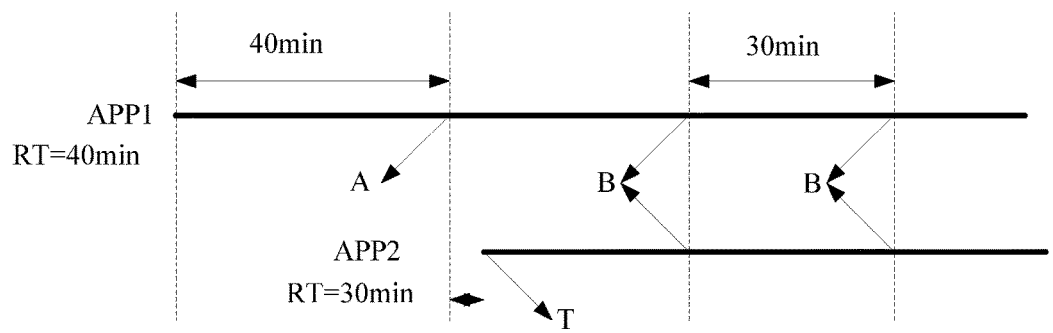
FIG. 7 is a schematic diagram illustrating a data interaction process according to the third embodiment.

Because the sum of the time point T and RT2 is smaller than the target required time (5+30=35<40), the RT corresponding to the current valid APP2 is determined as a target required time. In this case, when being reset, the timer of the DM is reset to 30 minutes, and after the RT reset by the DM expires (after 30 minutes), step S103 to step S104 are cyclically executed. For the specific data interaction process, refer to FIG. 7, where A is a time point of data interaction between the APP1 and the network, B is a time point of data interaction between APP1 and APP2 and the network, T is a time point when the valid APP2 submits registration, and RT is a required time.

The second case is that when an RT (the target required time is 40 minutes at this time) expires and at the 6th minute (corresponding to step S106, where the 6th minute is the time point T when the valid APP2 submits registration) after the broadcast of the DM, another valid APP2 submits registration information to the DM, where the RT2 of the valid APP2 is 35 minutes.

Figure 8:
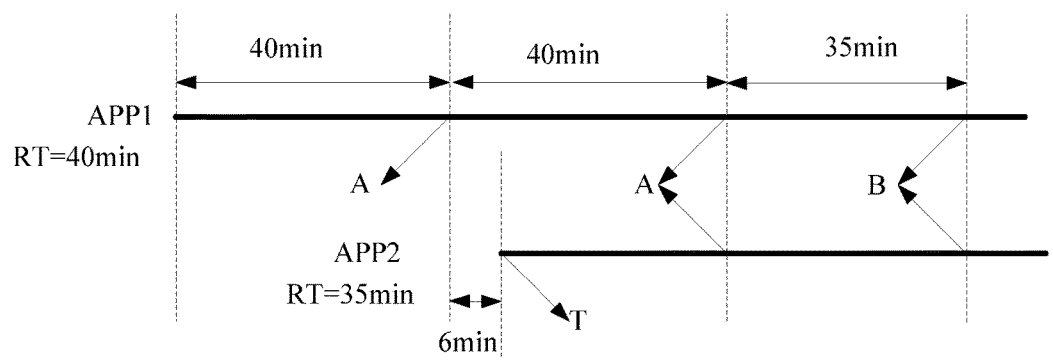
FIG. 8 is another schematic diagram illustrating a data interaction process according to the third embodiment.

Because the sum of the time point T and RT2 is greater than the target required time (6+35=41>40), execution continues until the current target required time expires so that the valid APP1 and the valid APP2 simultaneously complete data interaction with the network server, and then the minimum RT is selected from the RTs corresponding to the current valid APP1 and valid APP2 as a target required time of data interaction. In this case, when being reset (reset), the timer of the DM should be set to 35 minutes. Therefore, after the RT reset by the DM expires (35 minutes), step S103 to step S104 are cyclically executed. For the specific data interaction process, refer to FIG. 8. In FIG. 8, A is a time point of data interaction between the valid APP1 and the network, B is a time point of data interaction between the valid APP1 and valid APP2 and the network, T is a time point when the valid APP2 submits registration, and RT is a required time.

It should be noted that the description about the time point T in this embodiment is not limited to the minutes in the example, and that the range of the time point depends on the target required time so long as the time point is between the current target required time and the next target required time.

Through the example described in the third embodiment of the present invention, on the basis of solving the problem of synchronizing the frequency of data interaction between the valid APP in the background application mode in the terminal and the network, the problem of determining an accurate target required time after the terminal receives the registration information of the new valid APP is further solved. With the method disclosed by the present invention, the DM in the terminal can ensure coordinated control for each valid APP while receiving the registration information of a new valid APP, and use the minimum RT in the current RTs as a target required time. Therefore, power consumption of the terminal is reduced, plenty of electricity is saved, and the standby time of the terminal is prolonged.

It should be noted that if an invalid APP occurs when the third embodiment is executed, the problem can also be solved according to the method disclosed by the third embodiment. Therefore, using the method for data interaction disclosed by the third embodiment of the present invention not only can solve the problem of determining an accurate target required time after the terminal receives the registration information of the new valid APP, but also can solve the problem caused by occurrence of an invalid APP. Finally, the frequency of data interaction between each application running on the background and the network is synchronized, and the DM in the terminal is used to perform coordinated control for each valid APP, and on the basis of activating PDP only once, the respective data link is established to perform data interaction with the network, which, while satisfying each valid APP in the background application mode, reduces the number of times of activating PDP to establish data links, and achieves the purpose of decreasing power consumption, reducing electricity consumption of the terminal, and prolonging the standby time of the terminal.

Embodiment 4

With the method disclosed by the fourth embodiment, on the basis of executing steps of the first embodiment, second embodiment, or third embodiment disclosed by the present invention, the DM monitors the terminal in real time. The DM sends DM broadcast to each valid APP when receiving a PS service instruction actively initiated by the user, so that each valid APP establishes a data link to complete data interaction with the network and that the current resources are not wasted. The specific process is as follows:

The DM monitors in real time whether any PS instruction is actively initiated.

When an actively initiated PS instruction is detected, the DM sends a data interaction instruction (DM broadcast) to each valid APP, so that each valid APP performs data interaction with the network.

When no actively initiated PS instruction is detected, the step that should be currently executed in each embodiment continues to be executed.

Therefore, when the user actively initiates a PS service and the terminal enters the DCH state, using the method disclosed by the embodiment may solve the problem of resource waste caused by improper use and great power when the terminal enters the DCH state.

To be specific, when the DM detects a PS instruction actively initiated by the user, the terminal has entered the DCH state, and PDP has been activated. In this case, the DM sends a data interaction instruction to each valid APP, even if the timer of the valid APP or DM does not expire at this time. For example, the required time of QQ is 40 minutes and expires after 10 minutes; after the DM broadcast, QQ also uses the current occasion to complete data interaction with the network, and resets the timer of the DM (because data interaction between QQ and the network is performed within the maximum required time of 40 minutes). If several applications similar to QQ currently run on the background, the method disclosed by this embodiment can reduce the number of times of activating PDP, and at the same time, achieve the purpose of saving electricity and prolonging the standby time of the terminal.

To embody the method disclosed by the embodiment of the present invention more clearly, an example is described herein. For example, in the actual application of the terminal, currently three applications need to run on the background, and need to interact with the network. The three applications are respectively: email, twitter, and QQ. The RT of email is 10 minutes, the RT of twitter is 15 minutes, and the RT of QQ is 40 minutes.

After power-on of the terminal, the three applications uniformly submit RTs to the DM, and the DM uses 10 minutes as its timer time. If the user uses a browser to open a web page (the user actively initiates a PS service) at the 5th minute after power-on, PDP is activated. In the case, the DM sends a notification to the three applications, and the three applications simultaneously initiate data links and obtain data from the server. Thereby, the occasion of the PDP activation actively initiated by the user is used to complete interaction between all applications and the network, and at the same time, all timers need to be reset.

If the DM has not detected any PS service instruction actively initiated by the user, the three applications are always under the management of the DM to perform data interaction with the network. At the 10th minute after power-on of the terminal, the timer of the DM expires for the first time and the DM performs broadcasting, and the email and twitter send requests at the same time for establishing a data link after receiving a notification, and complete the data interaction with the network server. The same case occurs at the 20th minute and 30th minutes. However, at the 40th minutes, the RT of QQ satisfies data interaction conditions, and after the DM performs broadcasting, all the three applications establish data links and complete data interaction with the server. Thereby, compared with the method of the prior art that causes the terminal to activate PDP seven times and establish data links, the method disclosed by the present invention uses the MD in the terminal to perform coordinated control for each APP, so that the terminal activates PDP only four times and establishes data links. Therefore, not only power consumption of the terminal is reduced, but also plenty of electricity is saved, and the standby time of the terminal is prolonged.

A method for data interaction is described in detail in the above embodiments disclosed by the present invention. The method of the present invention may be implemented by using multiple forms of apparatuses. Therefore, the present invention also discloses an apparatus for data interaction, and the following is a detailed description of specific embodiments.

Figure 9:
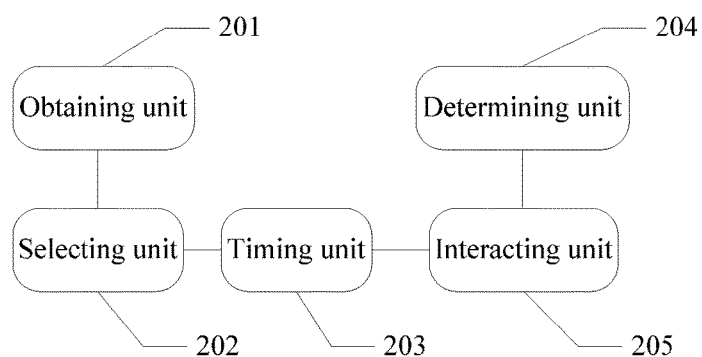
FIG. 9 is a schematic structural diagram of an apparatus for data interaction according to the present invention.

FIG. 9 is a schematic structural diagram of an apparatus for data interaction according to the present invention, mainly including: an obtaining unit 201, a selecting unit 202, a timing unit 203, a determining unit 204, and an interacting unit 205.

The obtaining unit 201 is configured to obtain RTs of data interaction between valid APPs in the background application mode and the network.

The selecting unit 202 is configured to select a minimum RT from the current RTs as a target required time of data interaction.

The timing unit 203 is configured to required timestart timing and reset the target required time.

The determining unit 204 is configured to: when the target required time expires, obtain each valid APP whose current required time of data interaction is between two consecutive target required times, and determine the valid APP as a target APP.

The interacting unit 205 is configured to activate PDP, establish a data link between the target APP and the network, and return to the selecting unit after performing data interaction.

When the data interaction between the valid APPs in the terminal and the network is controlled, first, the obtaining unit 201 obtains the RTs of data interaction with the network that are submitted by the valid APPs to the DM; then the selecting unit 202 selects the minimum RT from the RTs submitted by one or more valid APPs as a target required time of the DM, that is, used for the DM to send broadcast to control the required time of data interaction between each valid APP and the network; then after the target required time is determined, the timing unit 203 starts timing, and when the required time expires, the determining unit 204 determines that the RT in the timer of each current valid APP is between two consecutive target required times of the DM, and determines the valid APPs satisfying the above condition as target APPs; finally, the interacting unit 205 activates PDP, and enables the determined target APPs to establish data links for data interaction with the network, and at the same time, the timing unit 203 restarts timing after resetting the target required time, and triggers the selecting unit 202 to continue the next cycle.

With the units in the apparatus disclosed by the present invention, the DM can complete uniform management for each valid APP, so that the frequency of data interaction between each valid APP satisfying the condition and the network is synchronized, which, while satisfying each APP, decreases the number of times of activating PDP to establish data links, and achieves the purpose of decreasing power consumption, reducing electricity consumption of the terminal, and prolonging the standby time of the terminal.

Figure 10:
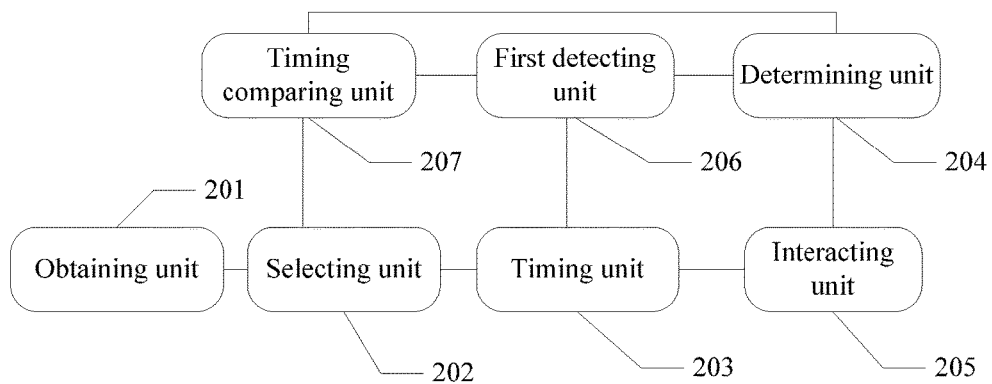
FIG. 10 is a schematic structural diagram of another apparatus for data interaction according to the present invention.

FIG. 10 is a schematic structural diagram of another apparatus for data interaction according to the present invention, mainly including: an obtaining unit 201, a selecting unit 202, a timing unit 203, a determining unit 204, an interacting unit 205, a first detecting unit 206, and a timing comparing unit 207.

As seen from FIG. 10, on the basis of the apparatus shown in FIG. 9, the apparatus disclosed by the present invention adds a first detecting unit 206 connected between the timing unit 203 and the determining unit 204, and a timing comparing unit 207 respectively connected to the first detecting unit 206, the selecting unit 202, and the determining unit 204.

The first detecting unit 206 is configured to detect whether an invalid APP occurs in valid APPs, and if so, shield the invalid APP and then trigger the timing comparing unit 207, or if not, directly trigger the determining unit 204.

The timing comparing unit 207 is configured to judge whether the RT of the invalid APP is the current target required time, and if so, trigger the selecting unit 202, or if not, trigger the determining unit 204.

In the apparatus disclosed by FIG. 10, functions of the obtaining unit 201, selecting unit 202, timing unit 203, determining unit 204, and interacting unit 205 are consistent with those of the obtaining unit 201, selecting unit 202, timing unit 203, determining unit 204, and interacting unit 205 in the apparatus shown in FIG. 9, and are not further described herein.

However, the difference from the above disclosed apparatus lies in that: after the timing unit 203 starts timing, the first detecting unit 206 detects each valid APP, and if no invalid APP occurs, the timing unit 203 directly triggers the determining unit 204 to continue the next cycle.

If an invalid APP occurs, the timing comparing unit 207 is triggered to judge whether the RT corresponding to the current invalid APP is the current target required time, and if not, directly trigger the determining unit 204 and continue to execute the cycle, or if so, return to the selecting unit 202 to reselect the current minimum RT as a target required time and continue to execute the cycle. Therefore, the apparatus disclosed by the present invention is further improved.

Figure 11:
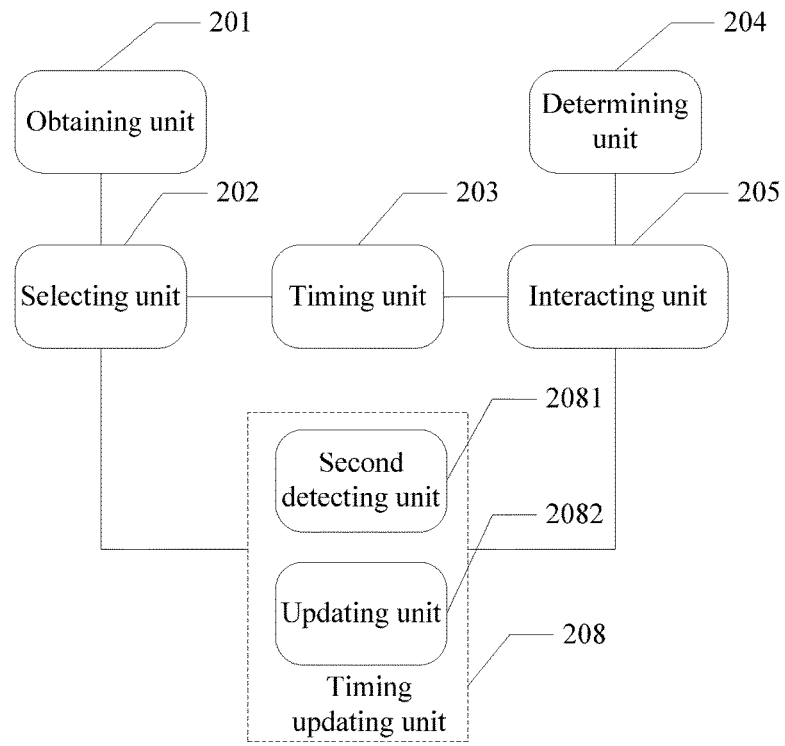
FIG. 11 is a schematic structural diagram of another apparatus for data interaction according to the present invention.

FIG. 11 is a schematic structural diagram of another apparatus for data interaction according to the present invention, mainly including: an obtaining unit 201, a selecting unit 202, a timing unit 203, a determining unit 204, an interacting unit 205, and a timing updating unit 208. The timing updating unit 208 is connected between the determining unit 204 and the selecting unit 202.

The timing updating unit 208 includes: a second detecting unit 2081 and an updating unit 2082.

The second detecting unit 2081 is configured to detect a new RT of a new valid APP obtained at a time point after the target required time is reset and before the next target required time expires.

The updating unit 2082 is configured to judge whether the sum of the new RT and the time point is smaller than the current target required time, and if so, update the current target required time, and trigger the determining unit 204 after determining the new RT as the target required time, or if not, directly trigger the determining unit 204.

It should be noted that in the apparatus disclosed by FIG. 11, functions of the obtaining unit 201, selecting unit 202, timing unit 203, determining unit 204, and interacting unit 205 are consistent with those of the obtaining unit 201, selecting unit 202, timing unit 203, determining unit 204, and interacting unit 205 in the apparatus shown in FIG. 9, and are not further described herein.

As seen from FIG. 11, when the timing unit 203 is restarted or reset, the second detecting unit 2081 in the updating unit 208 detects whether there is a new APP submitting registration, and if not, directly triggers the determining unit 204 and continues to execute the cycle process.

If it is determined that there is a new APP, the updating unit 2082 judges whether the sum of the new RT and the time point T of receiving registration information submitted by the new APP is smaller than the current target required time, and if smaller, updates the current target required time to the new RT, and then directly triggers the determining unit 204 and continues to execute the cycle, or if greater, directly triggers the determining unit 204 and returns to the selecting unit 202 through the interacting unit 205.

It should be noted that the interacting unit 205 may also be directly connected to the selecting unit, and after the updating unit 2082 determines that the sum of the new RT and the time point T of receiving the new APP is greater than the current target required time, the updating unit 2082 may directly trigger the determining unit 204, and return to the timing unit 203 through the interacting unit 205.

In a schematic structural diagram of another apparatus for data interaction according to the present invention, the apparatus additionally includes a monitoring unit on the basis of the above disclosed units.

The monitoring unit is configured to monitor whether any packet switched instruction is actively initiated, and when detecting an actively initiated packet switched instruction, send a data interaction instruction to the interacting unit.

With the added monitoring unit, when the terminal enters the DCH state, the great power generated because the terminal enters the state can be used properly, and on the basis of activated PDP, the process of establishing data links between valid APPs and the network for performing data interaction is completed, thereby decreasing the number of times of activating PDP by the valid APPs in the background application mode, saving power resources, and further saving the electricity of the terminal.

To conclude:

With the method and apparatus for data interaction disclosed by the present invention, the frequency of data interaction between each application running on the background and the network is synchronized, and on the basis of activating PDP only once, the data link of each application is established to perform data interaction with the network, which, while satisfying each valid APP in the background application mode, decreases the number of times of activating PDP to establish data links, and achieves the purpose of decreasing power consumption, reducing electricity consumption of the terminal, and prolonging the standby time of the terminal.

In addition, by means of real-time monitoring, the DM monitors whether any PS service is actively initiated, and uses the activated PDP to establish data links, so that each valid APP performs data interaction with the network, thereby further decreasing power consumption of the terminal, reducing the number of times of activating PDP to establish data links, and achieving the purpose of reducing electricity consumption of the terminal and prolonging the standby time of the terminal.

All embodiments describe the present invention by using the progressive method. Each embodiment describes only the difference from other embodiments. For the similar parts among all embodiments, reference may be made to the relevant parts. The apparatus disclosed in the embodiment is related to the method disclosed in the embodiments, and is therefore outlined. For the associated part, reference may be made to the description in the method embodiments.

The steps of the method or algorithm described herein may be implemented by using hardware directly or by using a software module executed by a processor, or by using both of them. The software module may be located in a Random Access Memory (RAM), a computer memory, a Read Only Memory (ROM), an Electrically Programmable ROM, an Electrically Erasable Programmable ROM, a register, a hard disk, a removable disk, a CD-ROM, or any other storage media well-known in the art.

The preceding description disclosed in the embodiments allows a person skilled in the art to implement or use the present invention. Multiple modifications to these embodiments are apparent for a person skilled in the art. The general principle defined in the present invention may be implemented in other embodiments without departing from the spirit or scope of the present invention. Therefore, the present invention will not be limited to the embodiments described in the document but extends to the widest scope that complies with the principle and novelty disclosed in the document.

What is claimed is:

1. A method for data interaction, comprising:
   obtaining, by a terminal, a first time interval associated with a first application running in a background of the terminal, wherein the first time interval is a time period of a first timer, wherein the first timer is associated with the first application and the first timer runs periodically based on the first time interval;

obtaining, by the terminal, a second time interval associated with a second application running in the background of the terminal, wherein the second time interval is a time period of a second timer, wherein the second timer is associated with the second application and the second timer runs periodically based on the second time interval;

after the first timer and the second timer are started, activating, by the terminal, a first packet data protocol (PDP) when the first timer expires, wherein the first timer expires before the second timer expires and the second timer expires before the next expiration of the first timer;

establishing by the terminal, based on the activated first PDP, a first data link between the first application and a network to perform data interaction for the first application;

establishing by the terminal, based on the activated first PDP, a second data link between the second application and the network to perform data interaction for the second application; and restarting, by the terminal, the first timer and the second timer when the first application and the second application perform data interaction.

2. The method according to claim 1, after the restarting the first timer and the second timer, the method further comprising:

obtaining, by the terminal, a third time interval associated with a third application running in the background of the terminal, wherein the third time interval is a time period of a third timer, wherein the third timer is associated with the third application and the third timer runs periodically based on the third time interval;

activating, by the terminal, a second PDP when the third timer expires, wherein the third timer expires before the first timer expires, the first timer expires before the next expiration of the third timer, and the second timer expires before the next expiration of the third timer;

establishing by the terminal, based on the activated second PDP, the first data link to perform data interaction for the first application;

establishing by the terminal, based on the activated second PDP, the second data link to perform data interaction for the second application;

establishing by the terminal, based on the activated second PDP, a third data link between the third application and the network to perform data interaction for the third application; and restarting, by the terminal, the first timer, the second timer and the third timer when the first application, the second application and the third application perform data interaction.

3. The method according to claim 1, after the restarting the first timer and the second timer, the method further comprising:

obtaining, by the terminal, a third time interval associated with a third application running in the background of the terminal, wherein the third time interval is a time period of a third timer, wherein the third timer is associated with the third application and the third timer runs periodically based on the third time interval;

activating, by the terminal, a second PDP when the third timer expires, wherein the third timer expires before the first timer expires, the first timer expires before the next expiration of the third timer, and the second timer expires after the next expiration of the third timer;

establishing by the terminal, based on the activated second PDP, the first data link to perform data interaction for the first application;

establishing by the terminal, based on the activated second PDP, a third data link between the third application and the network to perform data interaction for the third application, wherein no data link is established for the second application; and restarting, by the terminal, the first timer and the third timer and keeping the second timer running when the first application and the third application perform data interaction.

4. The method according to claim 1, after the restarting the first timer and the second timer, the method further comprising:

obtaining, by the terminal, a third time interval associated with a third application running in the background of the terminal, wherein the third time interval is a time period of a third timer, wherein the third timer is associated with the third application and the third timer runs periodically based on the third time interval;

activating, by the terminal, a second PDP when the third timer expires, wherein the third timer expires before the first timer expires, the first timer expires after the next expiration of the third timer, and the second timer expires after the next expiration of the third timer;

establishing by the terminal, based on the activated second PDP, a third data link between the third application and the network to perform data interaction for the third application, wherein no data link is established for the first application and no data link is established for the second application; and restarting, by the terminal, the third timer and keeping the first timer and the second timer running when the third application performs data interaction.

5. The method according to claim 1, after the restarting the first timer and the second timer, the method further comprising:

obtaining, by the terminal, a third time interval associated with a third application running in the background of the terminal, wherein the third time interval is a time period of a third timer, wherein the third timer is associated with the third application and the third timer runs periodically based on the third time interval;

activating, by the terminal, a second PDP when the first timer expires, wherein the first timer expires before the second timer and the third timer expire, the second timer expires before the next expiration of the first timer, and the third timer expires before the next expiration of the first timer;

establishing, by the terminal, the first data link based on the activated second PDP;

establishing, by the terminal, the second data link based on the activated second PDP;

establishing by the terminal, based on the activated second PDP, a third data link between the third application and the network to perform data interaction for the third application; and restarting, by the terminal, the first timer, the second timer and the third timer when the first application, the second application and the third application perform data interaction.

6. The method according to claim 1, after the restarting the first timer and the second timer, the method further comprising:

obtaining, by the terminal, a third time interval associated with a third application running in the background of the terminal, wherein the third time interval is a time period of a third timer, wherein the third timer is associated with the third application and the third timer runs periodically based on the third time interval;

activating, by the terminal, a second PDP when the first timer expires, wherein the first timer expires before the second timer and the third timer expire, the second timer expires before the next expiration of the first timer, and the third timer expires after the next expiration of the first timer;

establishing, by the terminal, the first data link based on the activated second PDP;

establishing, by the terminal, the second data link based on the activated second PDP, wherein no data link is established for the third application; and restarting, by the terminal, the first timer and the second timer and keeping the third timer running when the first application and the second application perform data interaction.

7. The method according to claim 1, after the restarting the first timer and the second timer, the method further comprising:

obtaining, by the terminal, a third time interval associated with a third application running in the background of the terminal, wherein the third time interval is a time period of a third timer, wherein the third timer is associated with the third application and the third timer runs periodically based on the third time interval;

activating, by the terminal, a second PDP when the first timer expires, wherein the first timer expires before the second timer and the third timer expire, the second timer expires after the next expiration of the first timer, and the third timer expires before the next expiration of the first timer;

establishing, by the terminal, the first data link based on the activated second PDP; establishing by the terminal, based on the activated second PDP, a third data link between the third application and the network to perform data interaction for the third application, wherein no data link is established for the second application; and restarting, by the terminal, the first timer and the third timer and keeping the second timer running when the first application and the third application perform data interaction.

8. A terminal for data interaction, comprising:
a memory;
a processor coupled to the memory, wherein the processor when executing is configured to:
obtain a first time interval associated with a first application running in a background of the terminal, wherein the first time interval is a time period of a first timer, wherein the first timer is associated with the first application and the first timer runs periodically based on the first time interval;
obtain a second time interval associated with a second application running in the background of the terminal, wherein the second time interval is a time period of a second timer, wherein the second timer is associated with the second application and the second timer runs periodically based on the second time interval;
after the first timer and the second timer are started, activate a first packet data protocol (PDP) when the first timer expires, wherein the first timer expires before the second timer expires and the second timer expires before the next expiration of the first timer;

establish, based on the activated first PDP, a first data link between the first application and a network to perform data interaction for the first application;
establish, based on the activated first PDP, a second data link between the second application and the network to perform data interaction for the second application; and
restart the first timer and the second timer when the first application and the second application perform data interaction.

9. The terminal according to claim 8, wherein the processor when executing is further configured to:
after the first timer and the second timer are restarted, obtain a third time interval associated with a third application running in the background of the terminal, wherein the third time interval is a time period of a third timer, wherein the third timer is associated with the third application and the third timer runs periodically based on the third time interval;
activate a second PDP when the third timer expires, wherein the third timer expires before the first timer expires, the first timer expires before the next expiration of the third timer, and the second timer expires before the next expiration of the third timer;
establish, based on the activated second PDP, the first data link to perform data interaction for the first application;
establish, based on the activated second PDP, the second data link to perform data interaction for the second application;
establish, based on the activated second PDP, a third data link between the third application and the network to perform data interaction for the third application; and
restart the first timer, the second timer and the third timer when the first application, the second application and the third application perform data interaction.

10. The terminal according to claim 8, wherein the processor when executing is further configured to:
after the first timer and the second timer are restarted, obtain a third time interval associated with a third application running in the background of the terminal, wherein the third time interval is a time period of a third timer, wherein the third timer is associated with the third application and the third timer runs periodically based on the third time interval;
activate a second PDP when the third timer expires, wherein the third timer expires before the first timer expires, the first timer expires before the next expiration of the third timer, and the second timer expires after the next expiration of the third timer;
establish, based on the activated second PDP, the first data link to perform data interaction for the first application;
establish, based on the activated second PDP, a third data link between the third application and the network to perform data interaction for the third application, wherein no data link is established for the second application; and
restart the first timer and the third timer and keep the second timer running when the first application and the third application perform data interaction.

11. The terminal according to claim 8, wherein the processor when executing is further configured to:
after the first timer and the second timer are restarted, obtain a third time interval associated with a third application running in the background of the terminal, wherein the third time interval is a time period of a third timer, wherein the third timer is associated with the third application and the third timer runs periodically based on the third time interval;

activate a second PDP when the third timer expires, wherein the third timer expires before the first timer expires, the first timer expires after the next expiration of the third timer, and the second timer expires after the next expiration of the third timer;

establish, based on the activated second PDP, a third data link between the third application and the network to perform data interaction for the third application, wherein no data link is established for the first application and no data link is established for the second application; and restart the third timer and keep the first timer and the second timer running when the third application performs data interaction.

12. The terminal according to claim 8, wherein the processor when executing is further configured to:

after the first timer and the second timer are restarted, obtain a third time interval associated with a third application running in the background of the terminal, wherein the third time interval is a time period of a third timer, wherein the third timer is associated with the third application and the third timer runs periodically based on the third time interval;

activate a second PDP when the first timer expires, wherein the first timer expires before the second timer and the third timer expire, the second timer expires before the next expiration of the first timer, and the third timer expires before the next expiration of the first timer;

establish the first data link based on the activated second PDP;

establish the second data link based on the activated second PDP;

establish, based on the activated second PDP, a third data link between the third application and the network to perform data interaction for the third application; and restart the first timer, the second timer and the third timer when the first application, the second application and the third application perform data interaction.

13. The terminal according to claim 8, wherein the processor when executing is further configured to:

after the first timer and the second timer are restarted, obtain a third time interval associated with a third application running in the background of the terminal, wherein the third time interval is a time period of a third timer, wherein the third timer is associated with the third application and the third timer runs periodically based on the third time interval;

activate a second PDP when the first timer expires, wherein the first timer expires before the second timer and the third timer expire, the second timer expires before the next expiration of the first timer, and the third timer expires after the next expiration of the first timer;

establish the first data link based on the activated second PDP;

establish the second data link based on the activated second PDP, wherein no data link is established for the third application; and restart the first timer and the second timer and keep the third timer running when the first application and the second application perform data interaction.

14. The terminal according to claim 8, wherein the processor when executing is further configured to:

after the first timer and the second timer are restarted, obtain a third time interval associated with a third application running in the background of the terminal, wherein the third time interval is a time period of a third timer, wherein the third timer is associated with the third application and the third timer runs periodically based on the third time interval;

activate a second PDP when the first timer expires, wherein the first timer expires before the second timer and the third timer expire, the second timer expires after the next expiration of the first timer, and the third timer expires before the next expiration of the first timer;

establish the first data link based on the activated second PDP;

establish, based on the activated second PDP, a third data link between the third application and the network to perform data interaction for the third application, wherein no data link is established for the second application; and restart the first timer and the third timer and keep the second timer running when the first application and the third application perform data interaction.

15. A computer program product, comprising program codes stored in a non-transitory computer readable storage medium for use by a terminal for data interaction, the program codes comprising instructions for:

obtaining a first time interval associated with a first application running in a background of the terminal, wherein the first time interval is a time period of a first timer, wherein the first timer is associated with the first application and the first timer runs periodically based on the first time interval;

obtaining a second time interval associated with a second application running in the background of the terminal, wherein the second time interval is a time period of a second timer, wherein the second timer is associated with the second application and the second timer runs periodically based on the second time interval;

after the first timer and the second timer are started, activating a first packet data protocol (PDP) when the first timer expires, wherein the first timer expires before the second timer expires and the second timer expires before the next expiration of the first timer;

establishing, based on the activated first PDP, a first data link between the first application and a network to perform data interaction for the first application;

establishing, based on the activated first PDP, a second data link between the second application and the network to perform data interaction for the second application; and restarting the first timer and the second timer when the first application and the second application perform data interaction.

16. The computer program product according to claim 15, further comprising instructions for:

after the restarting the first timer and the second timer, obtaining a third time interval associated with a third application running in the background of the terminal, wherein the third time interval is a time period of a third timer, wherein the third timer is associated with the third application and the third timer runs periodically based on the third time interval;

activating a second PDP when the third timer expires, wherein the third timer expires before the first timer expires, the first timer expires before the next expiration of the third timer, and the second timer expires before the next expiration of the third timer;

establishing, based on the activated second PDP, the first data link to perform data interaction for the first application;

establishing, based on the activated second PDP, the second data link to perform data interaction for the second application;

establishing, based on the activated second PDP, a third data link between the third application and the network to perform data interaction for the third application; and restarting the first timer, the second timer and the third timer when the first application, the second application and the third application perform data interaction.

17. The computer program product according to claim 15, further comprising instructions for:

after the restarting the first timer and the second timer, obtaining a third time interval associated with a third application running in the background of the terminal, wherein the third time interval is a time period of a third timer, wherein the third timer is associated with the third application and the third timer runs periodically based on the third time interval;

activating a second PDP when the third timer expires, wherein the third timer expires before the first timer expires, the first timer expires before the next expiration of the third timer, and the second timer expires after the next expiration of the third timer;

establishing, based on the activated second PDP, the first data link to perform data interaction for the first application;

establishing, based on the activated second PDP, a third data link between the third application and the network to perform data interaction for the third application, wherein no data link is established for the second application; and restarting the first timer and the third timer and keeping the second timer running when the first application and the third application perform data interaction.

18. The computer program product according to claim 15, further comprising instructions for:

after the restarting the first timer and the second timer, obtaining a third time interval associated with a third application running in the background of the terminal, wherein the third time interval is a time period of a third timer, wherein the third timer is associated with the third application and the third timer runs periodically based on the third time interval;

activating a second PDP when the third timer expires, wherein the third timer expires before the first timer expires, the first timer expires after the next expiration of the third timer, and the second timer expires after the next expiration of the third timer;

establishing, based on the activated second PDP, a third data link between the third application and the network to perform data interaction for the third application, wherein no data link is established for the first application and no data link is established for the second application; and restarting the third timer and keeping the first timer and the second timer running when the third application performs data interaction.

19. The computer program product according to claim 15, further comprising instructions for:

after the restarting the first timer and the second timer, obtaining a third time interval associated with a third application running in the background of the terminal, wherein the third time interval is a time period of a third timer, wherein the third timer is associated with the third application and the third timer runs periodically based on the third time interval;

activating a second PDP when the first timer expires, wherein the first timer expires before the second timer and the third timer expire, the second timer expires before the next expiration of the first timer, and the third timer expires before the next expiration of the first timer;

establishing the first data link based on the activated second PDP;

establishing the second data link based on the activated second PDP;

establishing, based on the activated second PDP, a third data link between the third application and the network to perform data interaction for the third application; and restarting the first timer, the second timer and the third timer when the first application, the second application and the third application perform data interaction.

20. The computer program product according to claim 15, further comprising instructions for:

after the restarting the first timer and the second timer, obtaining a third time interval associated with a third application running in the background of the terminal, wherein the third time interval is a time period of a third timer, wherein the third timer is associated with the third application and the third timer runs periodically based on the third time interval;

activating a second PDP when the first timer expires, wherein the first timer expires before the second timer and the third timer expire, the second timer expires before the next expiration of the first timer, and the third timer expires after the next expiration of the first timer;

establishing the first data link based on the activated second PDP;

establishing the second data link based on the activated second PDP, wherein no data link is established for the third application; and restarting the first timer and the second timer and keeping the third timer running when the first application and the second application perform data interaction.

* * * * *